Figure 1:
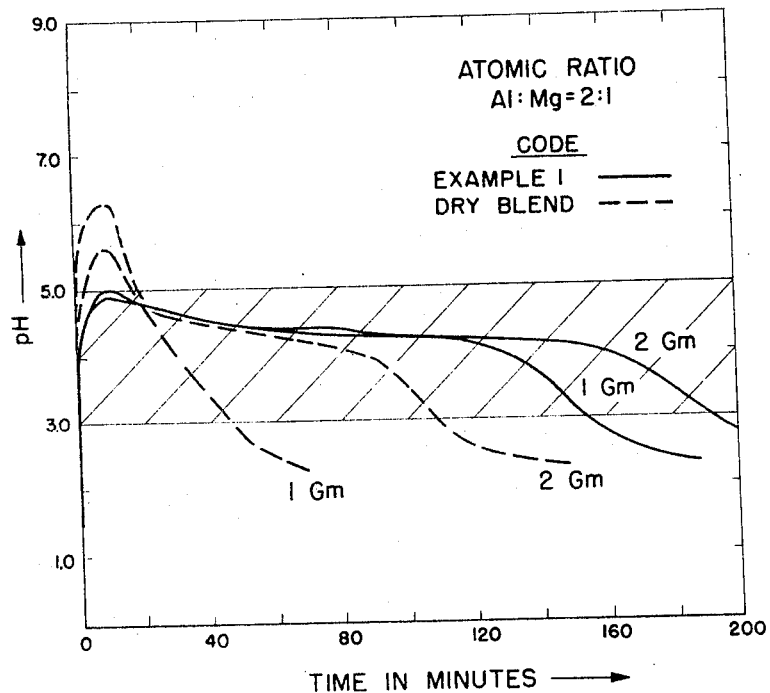

United States Patent Office 3,272,704
Patented Sept. 13, 1966

3,272,704
STABLE ALUMINUM HYDROXIDE-MAGNESIUM COMPOUND CODRIED GEL ANTACIDS AND PROCESS OF MAKING THE SAME
Stewart M. Beekman, Chatham, N.J., assignor, by mesne assignments, to Armour Pharmaceutical Company, Chicago, Ill., a corporation of Delaware
Filed June 6, 1963, Ser. No. 286,040
16 Claims. (Cl. 167—55)

This invention relates to antacid compositions, and, more particularly, to antacid compositions comprising aluminum hydroxide and magnesium hydroxide, carbonate or silicate, mixed as wet gels and codried, and stabilized by the addition of a hexitol, and to a process of preparing the same.

Antacid preparations are now quite generally employed for the treatment of peptic ulcers, gastric hyperacidity and dyspepsia. Gwilt, Livingstone and Robertson in the Journal of Pharmacy and Pharmacology, X, No. 12,770–775 (1958), describe the characteristics of an ideal antacid. They point out that it should show its maximum neutralizing effect in the shortest possible time, that it should neutralize an adequate amount of gastric hydrochloric acid and maintain its action during the normal period of gastric digestion, that any excess however great beyond the amount required to neutralize free gastric acid should not cause alkalization, that it should raise the pH of the gastric contents to a level at which pepsin activity is reduced significantly but not totally inhibited, that adequate and repeated doses should be palatable to the hyperacid patient, and that its use should not lead to laxative, constipating or other side effects such as gastric irritation. In addition to these factors the antacid composition should be inexpensive and it should not deteriorate significantly in any respect on aging. These workers summarize the various statements in the literature as to the pH ranges desirable for the ideal antacid, and conclude that a pH within the range from about 3.5 to about 4.5 is apparently the optimum to ensure adequate relief from hyperacidity, particularly if an ulcer site is present, and at the same time permits sufficient residual pepsin activity to avoid secondary digestive disturbances.

Edwards, in The Chemist and Druggist, December 14, 1957, page 647, also discusses the properties of an ideal antacid, and suggests that the nearest approach to the ideal attained as of that date was wet activated alumina gel. Dr. Edwards' views of the properties of the ideal antacid are in substantial agreement with those expressed by Gwilt et al.

Liquid aluminum hydroxide gel closely approaches the ideal for an antacid but its liquid form makes it inconvenient to use, especially in the case of ambulatory patients. The liquid gel is quite rapid in its action and gives a prolonged antacid effect in the optimum pH range. It is not significantly affected in its antacid properties by pepsin and it also does not significantly lose its antacid characteristics in aging. However, as Edwards and others have pointed out, it may have a mildly constipating effect which many have sought to remedy by combining it with other ingredients such as magnesium hydroxide or carbonate.

The advantages of the dried gel are obvious. However, the obvious material, dried aluminum hydroxide gel, is actually far from an ideal antacid. It exhibits a lag in its rate of reaction with stomach acids. It does not give a prolonged antacid in the optimum pH range and its antacid properties are severely affected by pepsin. Also, its antacid activity is less than that of the liquid gel, being decreased by the drying and the reduced activity decreases further with aging. These disadvantages have been noted by Gwilt et al. and other workers in this field.

Rossett and Flexner, Ann. Internal Fed., 21, 119 (1944) reported that mixtures of milk of magnesia (magnesium hydroxide) with aluminum hydroxide gel were more effective gastric antacids than aluminum hydroxide alone. These conclusions were based on in vivo experiments on humans, together with extensive clinical experience. Rossett and Rice, Gastroenterology, 26,490 (1954), Morrison, Am. J. Gastroenterology, 21, 301 (1954), and Jankelson, Am. J. Dig. Dis., 14, 11 (1947), reported that liquid aluminum magnesium hydroxide gels were effective for the treatment of peptic ulcer, hyperacidity, heartburn, spasticity and gastritis. However, simple mixtures of aluminum hydroxide and magnesium hydroxide dried gels have the disadvantage that they result in a high undesirable initial rise in pH, and they also show a rapid diminution in antacid activity on aging. This property is characteristic also of aluminum hydroxide dried gels.

In accordance with the invention, there is provided an antacid composition composed of a codried mixture of aluminum hydroxide and a magnesium compound selected from the group consisting of magnesium hydroxide, magnesium carbonate and magnesium trisilicate, together with a proportion of a hexitol. Such compositions have a more prolonged antacid activity in the optimum pH range of from 3 to 5 than corresponding dry blends containing the same basic components in the same proportions, and they do not display a high undesirable initial rise in pH. Furthermore, the compositions of the invention are relatively stable, and retain a very high antacid activity on aging, even after two years of storage.

The aluminum hydroxide-magnesium compound codried gels in accordance with the invention approach the theoretical requirements for an ideal antacid in dried form, because they are capable of rapidly increasing the pH of gastric juice to within the optimum range for very long periods of time, of the order of two hours and more. They do not display the initial high pH rise characteristic of the magnesium component. They are nonsystemic, and do not upset the acid-base balance of the blood. They are not adversely affected by pepsin in antacid action. They are non-irritating to the gastrointestinal tract. They have a desirable, mild astringent effect, with a minimal constipating or laxative effect. They are palatable, with very little chalkiness, and rehydrate and swell in water to provide a gelatinous, positively charged protective coating for inflamed membranes. Furthermore, they can be prepared at moderate cost, because of the process of their preparation.

The proportions of aluminum hydroxide and magnesium compound in the codried gel are quite critical in developing and maintaining a fast antacid action within the pH range of from 3 to 5. The molecular ratio of the components is expressed herein, for simplicity, as the atomic ratio Al:Mg, and this should be within the range from 2:1 to 0.25:1. Proportions of aluminum hydroxide to give an Al:Mg ratio in excess of 2:1 can be used, without disadvantageously affecting pH, but with the detriment that the composition is greatly slowed in its antacid action, so that the desired pH is not reached until a considerable time following administration, which is undesirable. The proportion of magnesium compound can exceed the Al:Mg ratio of 0.25:1, but when it does, the maximum pH following administration of the composition may rise to considerably in excess of 5, which is undesirable. Thus, the stated range represents the optimum proportions of the essential ingredients for effective and prompt antacid action.

The magnesium component can be a mixture of two or three of magnesium hydroxide, magnesium carbonate and magnesium trisilicate in any proportions. However, the total magnesium content is within the above-stated Al:Mg ratio range.

The composition can be prepared in any of several ways. The only prerequisite is that the aluminum hydroxide or aluminum hydroxy carbonate and magnesium carbonate, hydroxide or trisilicate be in hydrous, gelatinous form at the time of mixing. The components must not have been dried prior to use, i.e., they must contain a sufficient amount of the original gel water to make them moist, usually at least 5%. Any available aluminum hydroxide gels can be used, but the preferred gel is a highly reactive, freshly precipitated aluminum hydroxide containing some carbonate. Any of the available magnesium hydroxides can be used, provided they are in moist gel form. A preferred magnesium hydroxide gel is a 30% magnesium hydroxide paste obtained by controlled precipitation from pure aqueous solutions of magnesium sulfate and sodium hydroxide followed by filtration washing and mixing the washed hydrogel.

Usually, it will be convenient to employ a separately precipitated aluminum hydroxide and magnesium carbonate, hydroxide or trisilicate, but the magnesium compound may also be co-precipitated with the aluminum hydroxide or aluminum hydroxy carbonate from a common reaction solution, containing hydroxyl, carbonate, trisilicate, magnesium and aluminum ions, as required for the desired magnesium compound, such as a mixture of sodium hydroxide, magnesium sulfate, and aluminum sulfate, to give an aluminum hydroxide-magnesium hydroxide cogel.

The combined precipitates are filtered, and washed free of soluble salts. The mixed hydrous gels are then preferably subjected to a highly intensive shear at room temperature, and then reduced to finely divided powder form, such as by spray drying at a temperature below that at which the gels are adversely affected, or by low temperature air-drying, together with fine pulverizing. The hexitol is added to the mixed gels before milling or shearing.

As the stabilizing additive, any hexitol can be employed. Preferred hexitols are sorbitol and mannitol, because of their low cost and ready availability, and their existence in solid form at room temperature. The hexitol can be added to the hydrous gels in solid form, preferably finely pulverized, or in the form of an aqueous solution, and thoroughly mixed therewith to ensure uniform distribution throughout the composition. The amount of hexitol is not critical, but enough is used to give the desired effect on stability and pH. The amount can be within the range from 2 to 200% preferably within the range from 15 to 35%, by weight of the hydrous gels, calculated without the water content so as to correspond to the final codried composition weight.

The final composition of the invention is in the form of a codried gel which in finely divided or powdered form is generally soft, white, smooth, tasteless and odorless, and which reacts readily with gastric strength acid containing pepsin. The pH of aqueous suspensions of the stabilized gels in accordance with invention is from about 9 to about 9.6 when aluminum hydroxy carbonate is used as the source of aluminum hydroxide. The carbonate content of the final mixture will be within the range from about 5 to about 12%, dependent principally upon the method of drying. The spray-dried samples have spherically shaped particles and are free-flowing. The tray-dried and drum-dried compositions tend to be lump or flaky, but can reduced to a powder by pulverizing.

The following examples, in the opinion of the inventor, represent the best embodiments of the invention.

The antacid characteristics were determined by two methods.

The method of Holbert, Noble and Grote, J. Am. Pharm. Assn., 36, 149 (1947), 37, 292 (1948), Murphey, ibid., 41, 361 (1952) uses a test sample of antacid added to 150 ml. of pH 1.5 hydrochloric acid containing 2 g. of pepsin N.F. per liter (artificial gastric juice) at 37.5° C. 20 ml. of the artificial gastric juice is withdrawn every ten minutes and replaced with an equal volume of fresh gastric juice. The modified test procedure used in the work reported in this and the following examples, however, was carried out by continuously introducing fresh artificial gastric juice and removing the antacid-gastric juice mixture by overflow at the rate of 2 ml. per minute. The antacid effect is determined by measuring the pH of the artificial gastric juice during the test period, which is until the pH drops below 2.5.

The method of Bachrach used was as reported by Hinkel, Fisher and Tainter, J. Am. Pharm. Assn., 48, 380 (1959). This method consists essentially of adding dilute hydrochloric acid to the antacid at 37.5° C. at such a rate as to maintain a pH of 3.5. This method gives a direct estimate of the speed of action and total available activity, whereas the Holbert, Noble and Grote test procedure demonstrates primarily the buffering effect, as measured by pH and duration of action. In the test procedure as used in this work, the acid used was 0.0875 N hydrochloric acid, containing 2 grams of sodium chloride per liter.

*Examples 1 to 3*

A series of six codried gel antacids, three controls (A, B and C) and three in accordance with the invention (Examples 1, 2 and 3) was prepared in accordance with the following procedure. Highly reactive aluminum hydroxide U.S.P. and pure gelatinous magnesium hydroxide were separately precipitated to form slurries. The slurries were combined in the proportions given in Table I, filtered, and washed free of soluble salts. The mixed hydrous gels were then subjected to highly intensive shear at room temperature, and reduced to finely-divider powder form by spray-drying. Sorbitol (200 mg. per gram of final powder weight) in the form of a 70% aqueous solution was added to three of these compositions at the time the slurries were combined. The resulting codried gels were then analyzed for aluminum oxide and magnesium oxide, and the atomic ratio Al:Mg determined from the data obtained. The acid-consuming capacity of each antacid composition was determined, and is given in Table I.

TABLE I

| Example No. | Proportions of Components, Relative Amount per gm. | | | Ratio Al(OH)₃: Mg(OH)₂ | Product Analysis | | | Antacid Activity |
| --- | --- | --- | --- | --- | --- | --- | --- | --- |
| | Al(OH)₃* (mg.) | Mg(OH)₂ (mg.) | Sorbitol (mg.) | | Atomic Ratio, Al:Mg | Approximate Analysis | | Acid Consuming Capacity, ml. 0.1 N HCl/g. |
| | | | | | | Al₂O₃, Percent | MgO, Percent | |
| Control A | 773 | 227 | ---- | 3.4 :1 | 2:1 | 39.4 | 15.8 | 305 |
| Example 1 | 618 | 182 | 200 | 3.4 :1 | 2:1 | 31.5 | 12.6 | 250 |
| Control B | 629 | 371 | ---- | 1.7 :1 | 1:1 | 32.1 | 25.6 | 310 |
| Example 2 | 504 | 296 | 200 | 1.7 :1 | 1:1 | 25.7 | 20.4 | 254 |
| Control C | 459 | 541 | ---- | 0.85:1 | 0.5:1 | 23.4 | 37.4 | 314 |
| Example 3 | 367 | 433 | 200 | 0.85:1 | 0.5:1 | 18.7 | 30.0 | 260 |

*Al(OH)₃ U.S.P. calculated as 51% Al₂O₃.

Rock salt infra red spectra (2 to 16 microns) were run on Control A and Example No. 1, the aluminum hydroxide dried gel U.S.P. used as the starting material, the magnesium hydroxide gel N.F. used as the starting material, and crystalline sorbitol. Nujol and hexachlorobutadiene mulls were made, and samples run at capillary thicknesses vs. air.

The infra red spectra showed that both Control A and Example 1 were simple mixtures.

Antacid activity of the various gels was determined using the Holbert, Noble and Grote procedure, as described above, and the samples were evaluated on the basis of one and two grams dosage levels. The results for the three gel pairs, A and 1, B and 2, and C and 3, are given in Table II.

Figure 2:
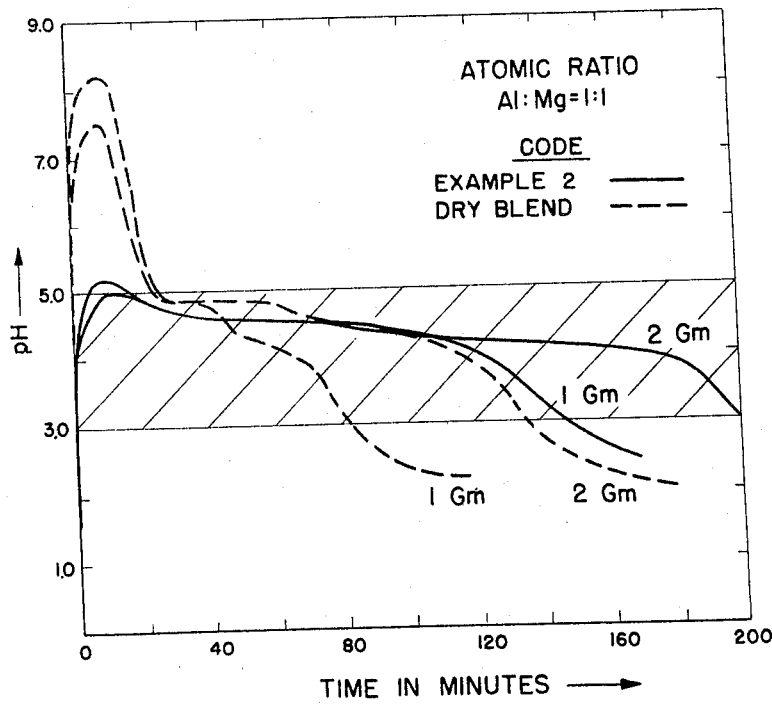
Figure 3:
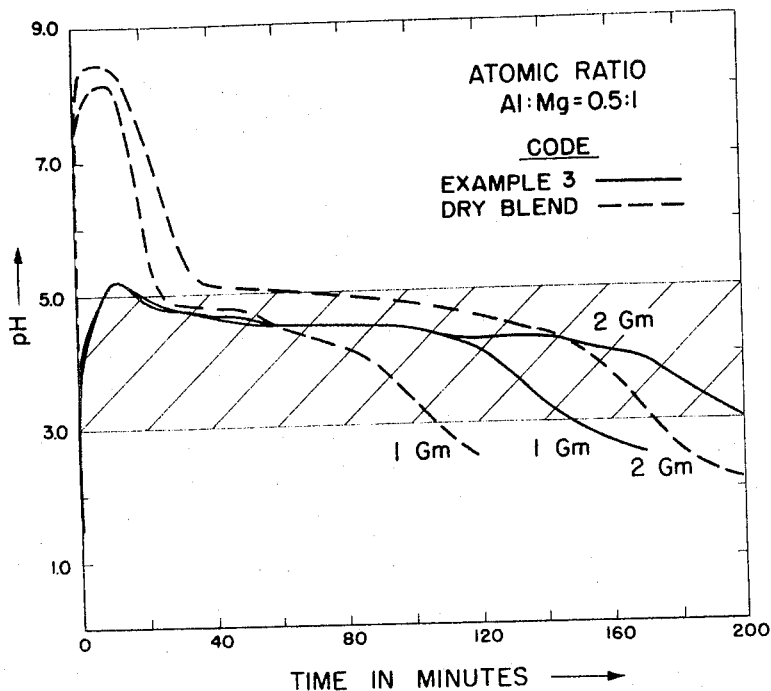
Figure 4:
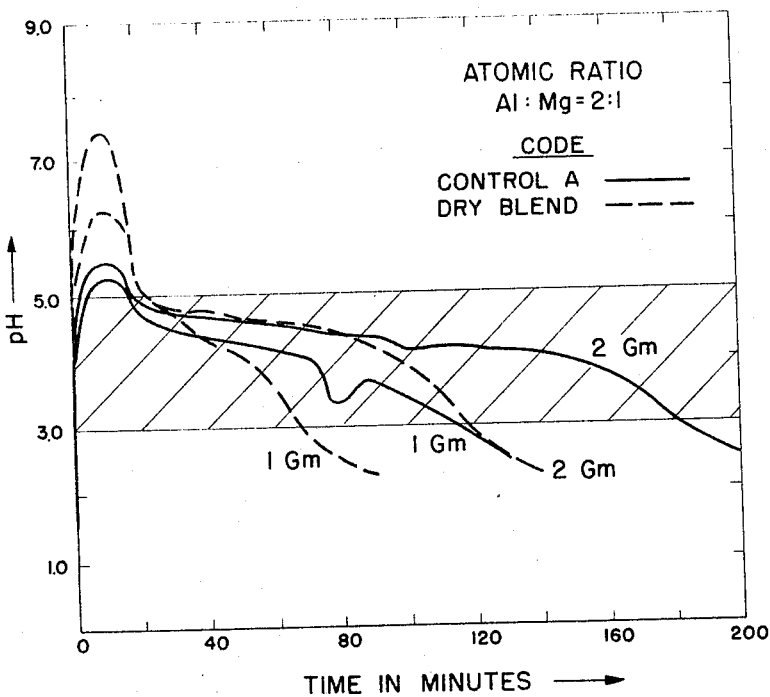
Figure 5:
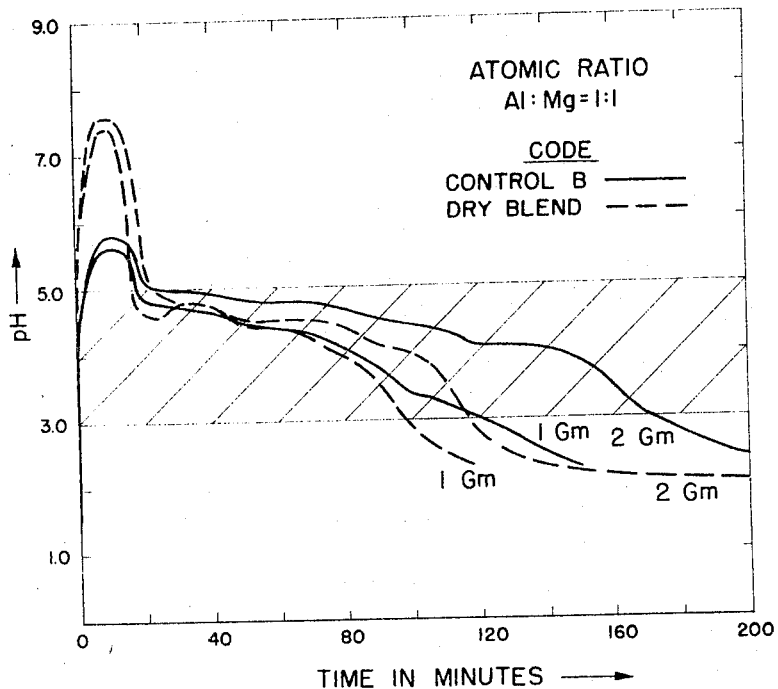
Figure 6:
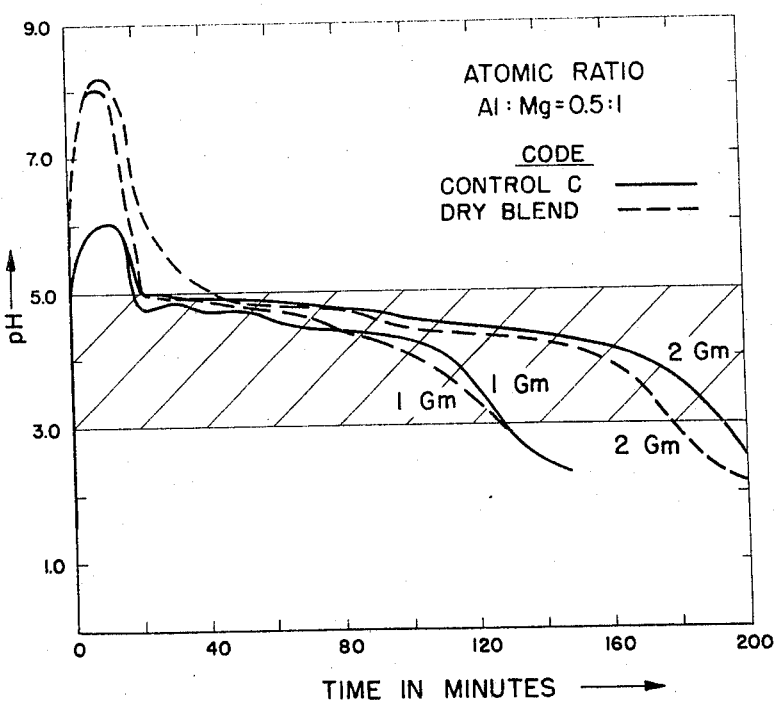

The Table II data, for Examples 1 to 3, is plotted in FIGURES 1 to 3, and the data for the three codried gels A to C is plotted in FIGURES 4 to 6. In each figure, for purpose of comparison, the comparative data for simple dry blends of the same composition are given.

TABLE II—PART A

Al:Mg Ratio 2:1

| Example No. | Control A, codried, no Sorbitol | | Dry Blend, No Sorbitol | | Example 1 with Sorbitol | | Dry Blend with Sorbitol | |
| --- | --- | --- | --- | --- | --- | --- | --- | --- |
| Dose, g | 1 | 2 | 1 | 2 | 1 | 2 | 1 | 2 |
| Time, min.: | | | | | | | | |
| 0 | 1.5 | 1.5 | 1.5 | 1.5 | 1.5 | 1.5 | 1.5 | 1.5 |
| 1 | 4.2 | 4.2 | 5.3 | 5.5 | 4.0 | 4.1 | 5.6 | 4.5 |
| 2 | 4.5 | 4.5 | 5.7 | 6.0 | 4.3 | 4.2 | 5.8 | 4.9 |
| 5 | 5.0 | 5.3 | 6.0 | 7.0 | 4.5 | 4.4 | 6.1 | 5.0 |
| 10 | 5.3 | 5.5 | 6.3 | 7.4 | 4.9 | 5.0 | 6.3 | 5.6 |
| 20 | 4.7 | 4.8 | 5.3 | 5.3 | 4.8 | 4.8 | 4.7 | 4.7 |
| 30 | 4.5 | 4.8 | 4.7 | 4.7 | 4.7 | 4.7 | 4.2 | 4.6 |
| 40 | 4.4 | 4.7 | 4.5 | 4.7 | 4.6 | 4.5 | 3.6 | 4.5 |
| 50 | 4.3 | 4.6 | 4.1 | 4.6 | 4.5 | 4.5 | 2.8 | 4.4 |
| 60 | 4.2 | 4.5 | 3.6 | 4.5 | 4.5 | 4.4 | 2.5 | 4.3 |
| 70 | 4.0 | 4.4 | 2.9 | 4.5 | 4.5 | 4.3 | 2.3 | 4.2 |
| 80 | 3.7 | 4.3 | 2.5 | 4.4 | 4.4 | 4.3 | ---- | 4.1 |
| 90 | 3.7 | 4.3 | 2.3 | 4.2 | 4.3 | 4.3 | ---- | 3.9 |
| 100 | 3.5 | 4.2 | ---- | 4.0 | 4.3 | 4.3 | ---- | 3.5 |
| 110 | 3.1 | 4.2 | ---- | 3.5 | 4.2 | 4.2 | ---- | 2.9 |
| 120 | 2.8 | 4.1 | ---- | 2.8 | 4.2 | 4.2 | ---- | 2.5 |
| 130 | 2.5 | 4.0 | ---- | 2.5 | 4.0 | 4.2 | ---- | 2.4 |
| 140 | ---- | 4.0 | ---- | 2.3 | 3.7 | 4.1 | ---- | 2.3 |
| 150 | ---- | 3.9 | ---- | ---- | 3.2 | 4.1 | ---- | 2.2 |
| 160 | ---- | 3.7 | ---- | ---- | 2.7 | 4.0 | ---- | ---- |
| 170 | ---- | 3.4 | ---- | ---- | 2.6 | 3.8 | ---- | ---- |
| 180 | ---- | 3.0 | ---- | ---- | 2.5 | 3.4 | ---- | ---- |
| 190 | ---- | 2.7 | ---- | ---- | ---- | 3.0 | ---- | ---- |
| 200 | ---- | 2.5 | ---- | ---- | ---- | ---- | ---- | ---- |

TABLE II—PART B

Al:Mg Ratio 1:1

| Example No. | Control B, codried, no Sorbitol | | Dry Blend, No Sorbitol | | Example 2 with Sorbitol | | Dry Blend with Sorbitol | |
| --- | --- | --- | --- | --- | --- | --- | --- | --- |
| Dose, g | 1 | 2 | 1 | 2 | 1 | 2 | 1 | 2 |
| Time, Min.: | | | | | | | | |
| 0 | 1.5 | 1.5 | 1.5 | 1.5 | 1.5 | 1.5 | 1.5 | 1.5 |
| 1 | 4.4 | 4.4 | 6.0 | 5.5 | 4.1 | 4.2 | 6.1 | 6.6 |
| 2 | 4.8 | 4.8 | 6.6 | 6.8 | 4.3 | 4.3 | 6.6 | 7.7 |
| 5 | 5.4 | 5.6 | 7.5 | 7.0 | 4.5 | 5.0 | 7.4 | 8.1 |
| 10 | 5.7 | 5.8 | 7.6 | 7.4 | 5.0 | 5.2 | 7.6 | 8.2 |
| 20 | 4.8 | 5.0 | 4.6 | 5.3 | 4.8 | 4.8 | 5.6 | 5.9 |
| 30 | 4.8 | 5.0 | 4.8 | 4.7 | 4.7 | 4.7 | 4.8 | 4.8 |
| 40 | 4.7 | 4.9 | 4.7 | 4.7 | 4.6 | 4.6 | 4.6 | 4.8 |
| 50 | 4.5 | 4.8 | 4.5 | 4.6 | 4.5 | 4.5 | 4.3 | 4.7 |
| 60 | 4.4 | 4.7 | 4.4 | 4.5 | 4.5 | 4.5 | 4.2 | 4.7 |
| 70 | 4.3 | 4.7 | 4.3 | 4.5 | 4.5 | 4.5 | 3.9 | 4.5 |
| 80 | 4.1 | 4.6 | 4.0 | 4.4 | 4.4 | 4.5 | 3.2 | 4.5 |
| 90 | 3.8 | 4.5 | 3.6 | 4.2 | 4.4 | 4.5 | 2.6 | 4.4 |
| 100 | 3.5 | 4.5 | 2.8 | 4.0 | 4.3 | 4.4 | 2.3 | 4.3 |
| 110 | 3.3 | 4.4 | 2.5 | 3.5 | 4.2 | 4.3 | 2.2 | 4.2 |
| 120 | 3.0 | 4.3 | 2.3 | 2.8 | 4.1 | 4.3 | ---- | 3.8 |
| 130 | 2.7 | 4.3 | ---- | 2.5 | 3.7 | 4.3 | ---- | 3.3 |
| 140 | 2.5 | 4.2 | ---- | 2.3 | 3.2 | 4.3 | ---- | 2.6 |
| 150 | 2.3 | 4.0 | ---- | 2.2 | 2.8 | 4.2 | ---- | 2.4 |
| 160 | ---- | 3.6 | ---- | 2.2 | 2.6 | 4.1 | ---- | 2.2 |
| 170 | ---- | 3.2 | ---- | 2.1 | 2.4 | 4.0 | ---- | ---- |
| 180 | ---- | 2.8 | ---- | 2.1 | ---- | 3.8 | ---- | ---- |
| 190 | ---- | 2.6 | ---- | 2.1 | ---- | 3.4 | ---- | ---- |
| 200 | ---- | 2.5 | ---- | 2.0 | ---- | 3.0 | ---- | ---- |
| 210 | ---- | 2.3 | ---- | 2.0 | ---- | 2.7 | ---- | ---- |
| 220 | ---- | ---- | ---- | ---- | ---- | 2.5 | ---- | ---- |

TABLE II—PART C

Al:Mg Ratio 0.5:1

| Example No. | Control C, codried, no Sorbitol | | Dry Blend, No Sorbitol | | Example 3 with Sorbitol | | Dry Blend with Sorbitol | |
| --- | --- | --- | --- | --- | --- | --- | --- | --- |
| Dose, g | 1 | 2 | 1 | 2 | 1 | 2 | 1 | 2 |
| Time minutes: | | | | | | | | |
| 0 | 1.5 | 1.5 | 1.5 | 1.5 | 1.5 | 1.5 | 1.5 | 1.5 |
| 1 | 4.5 | 4.7 | 6.4 | 6.7 | 4.1 | 4.2 | 7.0 | 8.1 |
| 2 | 5.3 | 5.5 | 7.3 | 7.6 | 4.2 | 4.3 | 7.9 | 8.5 |
| 5 | 5.8 | 6.0 | 8.0 | 8.0 | 4.6 | 4.6 | 8.3 | 8.5 |
| 10 | 6.1 | 6.1 | 8.1 | 8.1 | 5.2 | 5.2 | 8.3 | 8.6 |
| 20 | 4.7 | 5.0 | 6.5 | 6.5 | 4.9 | 4.8 | 5.8 | 7.5 |
| 30 | 4.8 | 5.0 | 5.0 | 5.5 | 4.7 | 4.7 | 4.9 | 5.8 |
| 40 | 4.7 | 5.0 | 4.9 | 5.1 | 4.6 | 4.6 | 4.8 | 5.2 |
| 50 | 4.7 | 5.0 | 4.7 | 4.8 | 4.5 | 4.6 | 4.7 | 5.1 |
| 60 | 4.6 | 4.9 | 4.7 | 4.8 | 4.5 | 4.5 | 4.5 | 5.0 |
| 70 | 4.5 | 4.8 | 4.5 | 4.7 | 4.5 | 4.5 | 4.3 | 4.9 |
| 80 | 4.5 | 4.7 | 4.5 | 4.7 | 4.5 | 4.5 | 4.2 | 4.9 |
| 90 | 4.4 | 4.7 | 4.3 | 4.6 | 4.4 | 4.4 | 3.9 | 4.8 |
| 100 | 4.3 | 4.6 | 4.1 | 4.5 | 4.4 | 4.4 | 3.4 | 4.7 |
| 110 | 4.1 | 4.5 | 3.9 | 4.4 | 4.1 | 4.3 | 2.8 | 4.7 |
| 120 | 3.6 | 4.5 | 3.4 | 4.4 | 4.1 | 4.3 | 2.5 | 4.6 |
| 130 | 3.0 | 4.4 | 2.9 | 4.4 | 3.7 | 4.3 | ---- | 4.5 |
| 140 | 2.5 | 4.4 | ---- | 4.3 | 3.2 | 4.2 | ---- | 4.3 |
| 150 | 2.3 | 4.3 | ---- | 4.1 | 3.0 | 4.2 | ---- | 4.1 |
| 160 | ---- | 4.2 | ---- | ---- | 3.9 | 4.1 | ---- | 3.7 |
| 170 | ---- | 4.0 | ---- | ---- | 2.7 | 4.0 | ---- | 3.1 |
| 180 | ---- | 3.7 | ---- | ---- | 2.7 | 3.8 | ---- | 2.6 |
| 190 | ---- | 3.3 | ---- | ---- | 2.3 | 3.4 | ---- | ---- |
| 200 | ---- | 2.8 | ---- | ---- | ---- | 3.0 | ---- | ---- |
| 210 | ---- | 2.5 | ---- | ---- | ---- | 2.7 | ---- | ---- |
| 220 | ---- | ---- | ---- | ---- | ---- | 2.5 | ---- | ---- |

It is apparent from the data in Table II and in the figures that the codried gels of the invention with sorbitol (Examples 1 to 3) are in every case superior to the codried gels without sorbitol (Controls A to C), as well as the dry blends with and without sorbitol. This is so despite the fact that Examples 1 to 3 had only 80% of the antacid content of Controls A to C. The initial rise is considerably lower, and the period of time within which the pH remains within the optimum range above 3 and below 5 is correspondingly extended.

In each case, the codried gels containing sorbitol did not initially give a pH increase to beyond the permissible limit of 5, and the period during which the pH remained above 3 was extended to as much as 3½ hours, depending upon the amount of sorbitol.

To determine the effect of aging on the codried gels, they were stored in glass containers which were kept closed at ambient temperatures for five months. The antacid activity of one gram samples was then determined by the Holbert, Noble and Grote test method and compared with values obtained on freshly prepared samples. The results are shown in Table III.

The improvement in stability is evident from this data. Whereas Control A was capable of maintaining the pH above 3 only for approximately 100 minutes, Example 1 could maintain the pH above 3 for more than ½ hour longer. Similarly, Control B could maintain the pH above 3 only for approximately an hour and a half, whereas Example 2 was capable of maintaining the pH above 3 for 2 hours and 20 minutes. Control C could maintain the pH above 3 only for somewhat over 100 minutes, whereas Example 3 could maintain the pH at 3 for 2 hours and 20 minutes.

A second series of comparative antacid activity tests was carried out on Controls A to C and Examples 1 to 3, employing the method of Bachrach on 2 gram samples. The test data is given in Table V, on the basis of 1 g. active antacid.

TABLE III

| Example No. | A — Antacid Activity, Time in Minutes H.N.&G. Test | | B — Loss in Activity After 5 Months, Percent | C — Antacid Activity of Corresponding Dry Blend, Time in Minutes, H.N.&G. Test | D — Increase in Activity of Item B over Item D |
|---|---|---|---|---|---|
| | 0 | 5 | | | |
| Control A | 142 | 113 | 20 | 68 | 66 |
| Example 1 | 145 | 134 | 8 | 47 | 185 |
| Control B | 142 | 102 | 28 | 97 | 3 |
| Example 2 | 142 | 137 | 4 | 83 | 66 |
| Control C | 135 | 127 | 6 | 128 | Same |
| Example 3 | 150 | 143 | 5 | 105 | 36 |

It is apparent from the data in Table III that whereas the gels which did not contain sorbitol showed a loss of activity of from 20 to 30% after five months' storage, the antacids in accordance with the invention, containing sorbitol, showed a loss in activity of only 4 to 8%. This comparison is with codried gels. When they dry blend is employed, the improvement in accordance with the invention is even more favorable. In this case, the addition of sorbitol has practically no effect.

In a second series of aging tests, samples of the gels of Example 1, 2 and 3 were stored in closed bottles at room temperature for two years, and the antacid activity then determined in accordance with the Holbert, Noble and Grote test procedure. The results are given in Table IV, on the basis of equal weights of active antacid ingredient.

TABLE IV

| Example No. | Atomic Ratio Al:Mg:2:1 | | Atomic Ratio Al:Mg:1:1 | | Atomic Ratio Al:Mg:1:2 | |
|---|---|---|---|---|---|---|
| | A | 1 | B | 2 | C | 3 |
| 0 | 1.5 | 1.5 | 1.5 | 1.5 | 1.5 | 1.5 |
| 1 | 3.1 | 3.8 | 4.0 | 4.0 | 4.5 | 4.0 |
| 5 | 4.3 | 4.3 | 5.0 | 4.4 | 5.8 | 4.4 |
| 10 | 4.4 | 4.7 | 5.4 | 4.9 | 6.0 | 5.0 |
| 20 | 4.2 | 4.5 | 4.4 | 4.6 | 4.8 | 4.6 |
| 40 | 4.0 | 4.3 | 4.3 | 4.4 | 4.5 | 4.4 |
| 60 | 3.9 | 4.1 | 4.1 | 4.3 | 4.3 | 4.3 |
| 80 | 3.8 | 4.0 | 3.2 | 4.2 | 4.1 | 4.2 |
| 100 | 3.1 | 3.9 | 2.5 | 4.1 | 3.2 | 4.2 |
| 110 | 2.7 | 3.8 | 2.3 | 4.0 | 2.7 | 4.1 |
| 120 | 2.5 | 3.6 | 2.2 | 3.8 | 2.4 | 3.9 |
| 130 | | 3.2 | | 3.5 | 2.2 | 3.5 |
| 140 | | 2.8 | | 3.0 | 2.1 | 3.0 |
| 150 | | 2.5 | | 2.7 | | 2.7 |
| 160 | | | | 2.5 | | 2.5 |
| 170 | | | | | | |
| Time to pH 3.0 sec | 58 | 56 | 58 | 37 | 36 | 34 |
| Time above pH 3.0 min | 101 | 133 | 83 | 140 | 103 | 140 |
| Time above pH 2.5 min | 118 | 150 | 98 | 158 | 116 | 158 |

TABLE V.—AMOUNT OF ACID ADDED (ml.)

| Time (min.) | Control A | Example 1 | Control B | Example 2 | Control C | Example 3 |
|---|---|---|---|---|---|---|
| 0 | 0 | 0 | 0 | 0 | 0 | 0 |
| 5 | 91 | 264 | 145 | 160 | 182 | 137 |
| 10 | 140 | 302 | 215 | 265 | 274 | 312 |
| 15 | 182 | 315 | 251 | 304 | 282 | 335 |
| 20 | 217 | 320 | 225 | 324 | 283 | 345 |
| 25 | 227 | 320 | 292 | 334 | 283 | 349 |
| 30 | 237 | 320 | 302 | 340 | 283 | 350 |
| 40 | 240 | 320 | 306 | 343 | 283 | 354 |
| 50 | 241 | 321 | 308 | 345 | 283 | 355 |
| 60 | 242 | 322 | 310 | 347 | 283 | 356 |

It is apparent from the data of this test that the acid consuming capacity, the total available activity and the speed of action are considerably greater for the compositions of the invention, Examples 1 to 3, as compared to the codried Control gels without sorbitol. The total acid consumed per hour is 12% to 37% greater.

*Example 4.—Preparation of magnesium hydroxide gel*

Magnesium hydroxide gel of high degree of purity which meets the U.S.P. specifications for magnesium hydroxide magma (milk of magnesia) when diluted to 7.0–8.5% $Mg(OH)_2$ was prepared by the controlled reaction between aqueous magnesium sulfate solution and sodium hydroxide solution. The precipitated gelatinous magnesium hydroxide slurry containing 3% $Mg(OH)_2$ was filtered and washed on a Komline-Sanderson Flexibelt rotary vacuum filter. The filter cake was mixed and yielded a smooth homogeneous paste of about 31% $Mg(OH)_2$ content.

*Preparation of aluminum magnesium hydroxide sorbitol codried gel Al:Mg atomic ratio 2:1–20% sorbitol*

683 lbs. of tap water, 482 lbs. of aluminum hydroxide compressed gel type F–1000, having an $Al_2O_3$ content of 10.2% and a reaction velocity by the standard Reheis method of 10-20 seconds, 90.3 lbs. of magnesium hydroxide gel containing 30.5% $Mg(OH)_2$ prepared as above, and 44.6 pounds of sorbitol U.S.P. (70% solution) was added to a 150 gallon Hamilton stainless steel double motion mixing kettle and mixed for 30 minutes. The resulting viscous slurry containing 12% product solids was pumped to a 250 gallon cylindrical Haveg 60 tank provided with a Premier 5″ Duplex Dispersator and mixed for 15 minutes at a speed of 2500 r.p.m. The highly sheared slurry was spray-dried in a Bowen 7 foot spray dryer using a 7″ CSE centrifugal atomizer operating at 21,000 r.p.m., an air inlet temperature of 750° F. and air outlet temperature of 250° F.

The resulting white finely-divided powder having spherical shaped particles had the following analysis:

| | |
|---|---|
| $Al_2O_3$, percent | 31.9 |
| MgO, percent | 12.95 |
| $CO_2$, percent | 10.6 |
| $Na_2O$, percent | 0.90 |
| Cl, percent | 0.09 |
| $SO_4$, percent | 0.3 |
| Heavy metals Pb, p.p.m. | <5 |
| Moisture (Dean and Starke), percent | 6 |
| Screen test (net), percent through 325 mesh | 99.25 |
| Acid consuming capacity (ml. N/10 HCl/g.) | 255 |
| Apparent density g. ml. | 0.34 |
| pH (4% suspension) | 9.2 |
| Reaction velocity, seconds (Reheis method) | 27 |

In the in vitro antacid evaluation by the Holbert, Noble and Grote test method, 1 gram sample increased the pH of 150 ml. artificial gastric juice (pH 1.5) to 3.0 in 46 seconds. The maximum pH achieved was 4.9 and the duration of time at a pH higher than 3.0 was 147 minutes, and 166 minutes at a pH higher than 2.5. This is extremely long for an antacid powder containing only 80% antacid ingredients. The 20% sorbitol has no acid consuming capacity or antacid property.

*Examples 5 to 7.*—(1) *Preparation of aluminum magnesium hydroxide mannitol codried gel Al containing 20% mannitol and having an Al:Mg atomic ratio of 2:1*

0.73 pound d-mannitol crystals, 12.25 pounds aluminum hydroxide compressed gel Reheis type F-1000 $Al_2O_3$-9.4%, 2.13 pounds magnesium hydroxide paste (31% $Mg(OH)_2$) and 14.9 pounds of water were mixed thoroughly in a 6 gallon stainless steel vessel, using a laboratory model Premier Duplex Dispersator having a speed of 15,000 r.p.m. The resulting highly sheared homogeneous slurry was dried in an air circulating oven on plastic trays at 125° F. until no further weight loss occurred. The dried lumps (3 lbs. 2 oz.) were pulverized by passing through a No. 1 Mikro pulverizer using an 0.035 inch herringbone screen and a speed of 5000 r.p.m.

(2) *Preparation of an aluminum magnesium hydroxide mannitol codried gel containing 20% mannitol and having an Al:Mg atomic ratio of 1:1*

The procedure was similar to that above with the following amounts of components used:

| | Lbs. |
|---|---|
| Aluminum hydroxide gel | 11.65 |
| Magnesium hydroxide paste | 5.9 |
| Mannitol crystals | 184 |
| Water | 13.47 |

3 pounds 11 ounces of dry cake was obtained, which was pulverized as above.

(3) *Preparation of an aluminum magnesium hydroxide mannitol codried gel containing 20% mannitol and having an Al:Mg atomic ratio of 0.5:1*

The procedure followed was similar to that above, with the following amounts of materials used:

| | Lbs. |
|---|---|
| Aluminum hydroxide compressed gel F-1000 | 8.5 |
| Magnesium hydroxide paste | 5.9 |
| d-Mannitol crystals | 0.84 |
| Water | 14.8 |

The tray-dried gel weighed 3 lbs. 12 ounces. It was pulverized to a fine powder.

*Preparation of comparative dry blends Controls X, Y and Z*

Dry blends of aluminum hydroxide dried gel U.S.P. magnesium hydroxide N.F. and d-mannitol crystals were prepared using the following amounts of materials in grams:

| | Atomic Ratio Al:Mg | | |
|---|---|---|---|
| | 2:1 | 1:1 | 0.5:1 |
| Aluminum hydroxide dried gel | 100 | 98 | 100 |
| Magnesium hydroxide N.F. | 30 | 58.3 | 116.7 |
| d-Mannitol crystals | 32.5 | 38.8 | 54.3 |

After mixing the dry components the mixture was passed several times through a Mikro Sample Mill which served to make the mixture homogeneous.

Evaluations of antacid properties of aluminum magnesium hydroxide mannitol codried gels and corresponding dry blends was carried out using the Holbert, Noble and Grote modified test method with 1.0 gram samples:

TABLE VI

| Time in minutes | Al:Mg Atomic Ratio | | | | | |
|---|---|---|---|---|---|---|
| | 2:1 | | 1:1 | | 0.5:1 | |
| | Control X | Example 5 | Control Y | Example 6 | Control Z | Example 7 |
| 0 | 1.5 | 1.5 | 1.5 | 1.5 | 1.5 | 1.5 |
| 1 | 5.5 | 3.4 | 6.2 | 4.0 | 6.7 | 4.1 |
| 2 | 5.7 | 4.0 | 6.5 | 4.1 | 7.3 | 4.2 |
| 5 | 5.9 | 4.1 | 7.0 | 4.4 | 7.7 | 4.8 |
| 10 | 6.1 | 4.3 | 7.2 | 4.9 | 7.8 | 5.2 |
| 20 | 4.8 | 4.3 | 5.0 | 4.5 | 4.6 | 4.6 |
| 30 | 4.1 | 4.3 | 5.1 | 4.3 | 5.2 | 4.4 |
| 40 | 3.1 | 4.2 | 5.0 | 4.3 | 5.1 | 4.3 |
| 50 | 2.6 | 4.2 | 4.6 | 4.2 | 4.9 | 4.2 |
| 60 | 2.4 | 4.1 | 4.1 | 4.2 | 4.7 | 4.2 |
| 70 | | 4.1 | 3.4 | 4.1 | 4.4 | 4.2 |
| 80 | | 4.0 | 2.7 | 4.1 | 4.1 | 4.1 |
| 90 | | 4.0 | 2.5 | 4.0 | 3.8 | 4.0 |
| 100 | | 3.9 | | 3.9 | 3.2 | 3.9 |
| 110 | | 3.9 | | 3.8 | 2.5 | 3.8 |
| 120 | | 3.6 | | 3.5 | | 3.5 |
| 130 | | 3.2 | | 3.1 | | 3.1 |
| 140 | | 2.8 | | 2.7 | | 2.7 |
| 150 | | 2.5 | | 2.5 | | 2.5 |
| 160 | | | | | | 5.2 |
| Max pH | 6.1 | 4.3 | 7.2 | 4.9 | 7.8 | 5.2 |
| Time above pH 3.0 | 43 | 133 | 74 | 133 | 102 | 133 |
| Time above pH 2.5 | 55 | 152 | 89 | 150 | 111 | 150 |

The aluminum magnesium hydroxide-mannitol codried blend 2:1 (Example 5), holds the pH at above 3.0 for approximately three times the time of the dry blend (Control X). The 1:1 gel (Example 6) gives 1.8 times the duration of the dry blend (Control Y) and the 0.5:1 gel (Example 7) gives a 30% longer time than Control Z. The maximum pH reached in no case exceeded 5.2 for the codried gels, but in the case of the blends pH ranged from 6.1 to 7.8.

*Example 8.—Aluminum hydroxide-magnesium carbonate sorbitol codried gel Al:Mg atomic ratio 2:1–20% sorbitol in dry product*

*Magnesium carbonate gel.*—57 pounds of magnesium chloride flakes $MgCl_2 6H_2O$ was dissolved in 250 pounds of water and filtered into a 60 gallon reactor vessel provided with a 4″ turbine type agitator with speed of 800 r.p.m. and at 21° C. Sodium carbonate solution (16.4° Bé equivalent to 11.9% $Na_2CO_3$) 243 pounds was added to the magnesium chloride solution at 0.45 gallon per minute. The resulting slurry was filtered and washed using a plate and frame filter press at 40 p.s.i.g. The magnesium carbonate gel filter cake was analyzed and found to contain 8.5% MgO.

483 pounds of an aluminum magnesium hydroxy carbonate gel containing 9.3% $Al_2O_3$, 1.4% MgO, and 3.4% $CO_2$ made in accordance with U.S. Patent 2,797,978, 128 pounds of a magnesium carbonate gel containing 8.5% MgO (prepared as above), 44.6 pounds of sorbitol 70% solution, and 744 pounds water were mixed for one hour in a 150 gallon Hamilton double motion herispherical stainless steel kettle after which the white somewhat viscous gel was pumped to a 750 gallon Haveg tank provided with a Premier 5 H.P. Duplex Dispersator and mixed for 20 minutes additional at 3600 r.p.m. The homogeneous slurry contained 12% product solids.

1350 pounds of the above was spray-dried in a Bowen 7 foot spray dryer using a 7″ CSE atomizer at 21,000 r.p.m. under different conditions. One portion was sprayed at a feed rate of 16 pounds a minute with inlet temperature of 750° F. and outlet temperature 275° F. 127 pounds of product were recovered from this portion.

The product was a white finely-divided powder with spherical shaped particles having the following analysis:

| | |
|---|---|
| $Al_2O_3$, percent | 27.9 |
| MgO, percent | 11.3 |
| $CO_2$, percent | 20.5 |
| Apparent density g./ml. | 0.38 |
| Screen test through 325 mesh | 99.2 |
| pH (4% suspension) | 8.6 |
| Acid consuming capacity (ml. 0.1 N HCl/g.) | 219 |
| Reaction velocity (Reheis) sec. | 2 |

The in vitro antacid evaluation test by the modified Holbert, Noble and Grote test after 14 months of aging gave the following results:

| | |
|---|---|
| Maximum pH | 4.6 |
| Time to pH 3.0, seconds | 6 |
| Time above pH 3.0, minutes | 131 |
| Time above pH 2.5, minutes | 147 |

*Example 9.—Aluminum hydroxide magnesium carbonate sorbitol codried gel Al:Mg atomic ratio 2:1 and 10% sorbitol dry basis*

A product made as above but containing only 10% sorbitol on the dry basis yielded the following results:

| | |
|---|---|
| $Al_2O_3$, percent | 30.1 |
| MgO, percent | 11.6 |
| $CO_2$, percent | 23.8 |
| pH (4% suspension) | 8.3 |
| Apparent density g./ml. | 0.26 |
| Moisture (Dean and Starke) | 8.7 |
| Acid consuming capacity (ml. 0.1 N HCl/g.) | 230 |

Antacid evaluation. After 14 months' storage the following results were obtained by the modified Holbert, Noble and Grote in vitro method, using a 1 gram dose:

| | |
|---|---|
| Maximum pH | 4.5 |
| Time to pH 3.0, seconds | 6 |
| Time above pH 3.0, minutes | 142 |
| Time above pH 2.5, minutes | 160 |

Both samples of aluminum hydroxide-magnesium carbonate sorbitol codried gels were evaluated for antacid properties using the Bachrach method. The results obtained on a 1 gram active ingredient basis are as follows:

TABLE VII

| Time (minutes) | Aluminum Hydroxide Magnesium Carbonate Sorbitol Codried Gel, Percent Sorbitol | |
|---|---|---|
| | 20 | 10 |
| 0 | 0 | 0 |
| 5 | 265 | 278 |
| 10 | 290 | 302 |
| 15 | 296 | 303 |
| 20 | 296 | 305 |
| 25 | 297 | 307 |
| 30 | 301 | 308 |
| 40 | 301 | 308 |
| 50 | 301 | 308 |
| 60 | 301 | 308 |

*Example 10.—Aluminum hydroxide-magnesium, hydroxide-magnesium trisilicate sorbitol codried gel containing equal weights of aluminum hydroxide U.S.P. dried gel (51% $Al_2O_3$), magnesium hydroxide N.F. (98% $Mg(OH)_2$), magnesium trisilicate U.S.P. (22% MgO) and 20% d-sorbitol*

136.0 pounds of aluminum hydroxide compressed gel Reheis type F–1000 containing 10.0% $Al_2O_3$, 84.5 pounds of magnesium hydroxide gel (31% $MgOH_2$), 26.7 pounds magnesium trisilicate U.S.P. powder (super bulky grade), 28.6 pounds of d-sorbitol (70% solution) and 390 pounds of water were mixed for one hour in a Hamilton double motion 150 gallon stainless steel kettle. The slurry was pumped to a second tank and agitated with a high shear mixer for an additional 15 minutes. The resulting homogeneous gel containing 159% product solids was spray-dried in a Bowen 7 foot dryer using a feed rate of 15.5 pounds per minute, a 7″ CSE atomizer at 21,000 r.p.m., inlet temperature of 250° F. and outlet temperature of 275° F.

The finely-divided white powder retained only 1% on a 45 micron screen. The analysis showed that it contained 13.6% $Al_2O_3$, 24% MgO, 13.2% $SiO_2$, 5.9% $CO_2$. The acid consuming capacity was 196 ml. 0.1 N HCl per gram which is close to the theoretical value of 199. The Al:Mg atomic ratio was 0.28:1.00.

The antacid properties were determined by the in vitro method of Holbert, Noble and Grote on the basis of 1.0 gram sample. The results are as follows:

TABLE VIII

| Time (minutes): | pH |
|---|---|
| 0 | 1.5 |
| 1 | 3.8 |
| 2 | 3.9 |
| 5 | 4.0 |
| 10 | 4.1 |
| 20 | 4.2 |
| 30 | 4.2 |
| 40 | 4.2 |
| 50 | 4.2 |
| 60 | 4.1 |
| 70 | 4.0 |
| 80 | 4.0 |
| 90 | 3.9 |
| 100 | 3.7 |
| 110 | 3.4 |
| 120 | 3.0 |
| | 2.6 |

TABLE VIII.—Continued

| Time (minutes): | pH |
|---|---|
| Time to pH 3.0 sec. | 30 |
| Time above pH 3.0 | 109 |
| Time above pH 2.5 | 125 |

The Bachrach method was also used to determine the speed of reaction and total antacid activity. The following data shows the number of milliliters of 0.0875 N HCl per 1.0 gram active ingredient as a function of time.

TABLE IX

| Time (minutes): | Volume, 0.0875 N HCl ml. |
|---|---|
| 0 | 0 |
| 5 | 123 |
| 10 | 198 |
| 15 | 250 |
| 20 | 265 |
| 25 | 268 |
| 30 | 270 |
| 40 | 270 |
| 50 | 270 |
| 60 | 270 |

As previously indicated, the compositions in accordance with the invention are useful in the treatment of internal conditions where excess acidity is to be encountered, such as gastric acidity in the stomach, in, for example, the treatment of gastric and peptic ulcers. For this purpose, the dry compositions are readily administered in the form of slurries, or as dry powders or tablets, with an excipient, if desired, which are suitably taken orally or added to a liquid carrier such as water.

It is usually most convenient to prepare the compositions in tablet form, and since the compositions are relatively inert and store well, tablets are easily prepared by conventional procedures. The composition can be tabletted as such, or with an excipient mixture of conventional type. The following is a typical tablet formulation:

| | Grams |
|---|---|
| Antacid composition | 32,000 |
| Lactose | 62,620 |
| Starch | 6,800 |
| Monosodium phosphate | 1,130 |
| Stearic acid | 1,130 |

The quantity indicated is sufficient to prepare approximately 48,000 tablets, containing 10 grains each of the antacid composition.

The following is claimed:

1. An antacid composition capable as determined by the modified Holbert, Noble and Grote test method of maintaining the pH of artificial gastric juice within the range from about 3 to about 5 for at least one hour, comprising the codried combination of a hydrous gelatinous aluminum hydroxide material selected from the group consisting of aluminum hydroxide and aluminum hydroxy carbonate and a gelatinous magnesium compound selected from the group consisting of magnesium hydroxide, magnesium carbonate and magnesium trisilicate in an atomic ratio Al:Mg within the range from about 2:1 to about 0.25:1 and from 2–200 percent of a hexitol selected from the group consisting of sorbitol and mannitol.

2. A antacid composition in accordance with claim 1 in which the aluminum hydroxide material is a hydrous gelatinous aluminum hydroxy carbonate.

3. An antacid composition in accordance with claim 1 in which the gelatinous magnesium compound is magnesium hydroxide.

4. An antacid composition in accordance with claim 1 in which the gelatinous magnesium compound is magnesium carbonate.

5. An antacid composition in accordance with claim 1 in which the gelatinous magnesium compound is magnesium trisilicate.

6. An antacid tablet comprising a composition in accordance with claim 1 and an excipient.

7. An antacid composition in accordance with claim 1 in which the hexitol is sorbitol and is present in an amount of from 15 to 35 percent.

8. An antacid composition in accordance with claim 1 in which the hexitol is mannitol.

9. A process for preparing an antacid composition capable as determined by the modified Holbert, Noble and Grote test method of maintaining the pH of artificial gastric juice within the range from about 3 to about 5 for at least one hour, which comprises mixing a moist hydrous gelatinous aluminum hydroxide material selected from the group consisting of aluminum hydroxide and aluminum hydroxy carbonate and a moist gelatinous magnesium compound selected from the group consisting of magnesium hydroxide, magnesium carbonate and magnesium trisilicate in an atomic ratio Al:Mg within the range from about 2:1 to about 0.25:1 and from 2–200 percent of a hexitol selected from the group consisting of sorbitol and mannitol in an amount to increase the stability of the composition to aging, and drying the resulting mixture.

10. A process in accordance with claim 9 in which the aluminum hydroxide material is aluminum hydroxy carbonate.

11. A process in accordance with claim 9 in which the gelatinous magnesium compound is magnesium hydroxide.

12. A process in accordance with claim 9 in which the gelatinous magnesium compound is magnesium carbonate.

13. A process in accordance with claim 9 in which the gelatinous magnesium compound is magnesium trisilicate.

14. A process in accordance with claim 9 in which the aluminum hydroxide material and the magnesium compound are formed as a moist hydrous gel in situ by coprecipitation from a common solution.

15. A process in accordance with claim 9 in which the hexitol is sorbitol.

16. A process in accordance with claim 9 in which the hexitol is mannitol.

References Cited by the Examiner

UNITED STATES PATENTS

| 2,999,790 | 9/1961 | Alford | 167—55 |
| 3,017,324 | 1/1962 | Beekman | 167—55 |

JULIAN S. LEVITT, *Primary Examiner.*

FRANK CACCIAPAGLIA, Jr., *Examiner.*

SAM ROSEN, *Assistant Examiner.*